United States Patent
Cline et al.

(10) Patent No.: US 7,801,865 B1
(45) Date of Patent: Sep. 21, 2010

(54) SYSTEM AND METHOD FOR PROVIDING ACCESS TO A DATABASE DURING A RECOVERY PROCESS

(75) Inventors: Richard Wayne Cline, Austin, TX (US); Stanley James Dee, Austin, TX (US); Michel Laviolette, Cedar Park, TX (US); Thomas G. Price, Austin, TX (US); John Grady Sullivan, Austin, TX (US)

(73) Assignee: BMC Software, Inc., Houston, TX (US)

( * ) Notice: Subject to any disclaimer, the term of this patent is extended or adjusted under 35 U.S.C. 154(b) by 360 days.

(21) Appl. No.: 11/968,037

(22) Filed: Dec. 31, 2007

(51) Int. Cl.
*G06F 17/30* (2006.01)

(52) U.S. Cl. ..................... 707/674

(58) Field of Classification Search .............. 707/2, 707/674; 711/154; 714/5
See application file for complete search history.

(56) References Cited

U.S. PATENT DOCUMENTS

| | | | |
|---|---|---|---|
| 5,930,824 A | * | 7/1999 | Anglin et al. ............... 711/162 |
| 6,202,136 B1 | * | 3/2001 | Wikle et al. ................. 711/162 |
| 6,266,808 B1 | * | 7/2001 | Govindaraj ................. 717/106 |
| 2003/0093630 A1 | * | 5/2003 | Richard et al. ............. 711/154 |
| 2004/0153718 A1 | * | 8/2004 | Shen et al. ..................... 714/5 |
| 2006/0053181 A1 | * | 3/2006 | Anand et al. ................ 707/204 |

* cited by examiner

*Primary Examiner*—Etienne P LeRoux
(74) *Attorney, Agent, or Firm*—Sprinkle IP Law Group

(57) ABSTRACT

Methods and systems for providing access to spaces in a database during a recovery process affecting the database. Spaces in the database that are affected by the recovery process are identified and I/O requests sent to a media manager associated with the database are intercepted. If the I/O request is for a read operation to a space affected by the recovery process and the corresponding page has been recovered, the data in the page may be read. If the page has not been recovered, the read operation may be held in a cache until the recovery utility indicates that the page has been recovered. If the I/O request is for a write operation to a space affected by the recovery process, the data may be written to a cache.

24 Claims, 4 Drawing Sheets

SYSTEM AND METHOD FOR PROVIDING ACCESS TO A DATABASE DURING A RECOVERY PROCESS

FIELD OF THE INVENTION

The present invention relates generally to database recovery. In particular, embodiments disclosed herein relate to systems and methods for providing access to spaces in a database while the database is in a recovery process.

BACKGROUND

A database is, fundamentally, a computerized record-keeping system in which large amounts of information may be stored in a structured manner for ease of subsequent retrieval and processing. Large databases such as the DB2® database from the International Business Machines Corporation of Armonk, N.Y., are typically managed through a database management system ("DBMS").

At times, a database may need recovery. There are two types of recovery-logical and disaster. Logical recovery generally refers to situations in which the data is physically present on a disk, but unusable due to logic errors. Disaster recovery generally refers to situations in which a disk has been damaged such that the data is unavailable.

It is important that after recovery of a database (or a portion thereof) the recovered database is both physically and logically consistent. To ensure this consistency, prior art database recovery techniques such as point-in-time (PIT) recovery require one or more table and index spaces to be disabled for application access while the data is being recovered. While this process generates a consistent recovered database, it prevents users from reading or updating the database objects until the database is recovered. This can be a significant drawback for large or complex databases and/or those databases that experience large update volumes.

Often times, most of the pages of the spaces are outside the scope of the PIT recovery, yet the pages remain unavailable for processing. For customers with a large number of online users, and assuming that the number of users affected by the PIT recovery is small, the unnecessary outages for the unaffected users can be costly. One approach has been to disable access to only the space being recovered. Although this may reduce the time needed to recover a database, access to the spaces in a recovery process is interrupted until all pages in each space have been recovered.

SUMMARY OF THE DISCLOSURE

Embodiments such as those described herein may be used to recover data resulting from logical losses in which the information is physically on the disk but may be logically corrupted. Embodiments may be used for extensive reconstruction of data lost during a disaster, in which disks may be lost and all information needed to restore the database is stored on tapes or some other form of backup.

Embodiments disclosed herein may be used to make data available as soon as a recovery process has started. One problem that embodiments address is the outage associated with data recovery. BMC Software, Inc. of Houston, Tex. has a backup and recovery product line for DB2® that reduces the outage associated with data recovery. For example, LOG-MASTER® and similar products provide point-in-time (PIT) recovery with no outage by generating "undo SQL" requests. However, I/O requests performed while an "undo SQL" request is processed may see the data as it existed before the recovery. Furthermore, in some embodiments, the data is presented as it exists after a recovery. Embodiments disclosed herein allow users to continue processing unaffected pages, and delay processing only for pages that are in the range being recovered. Advantageously, users accessing data outside the scope of a PIT recovery are unaware that a recovery is in process.

In one broad respect, embodiments disclosed herein may be directed to a method for providing access to a database during a recovery process. The process may include identifying a space in a database being recovered by a recovery utility, intercepting I/O requests intended for the space, allowing read and write operations for a page in the space which is unaffected by the recovery process, holding read requests for a page in the space until the recovery process has recovered the page specified in the read request, writing a page to a cache for spaces being recovered in the database, and writing a page to the space once the page specified in the request has been recovered. The recovery process may be a forward recovery process or a backward recovery process. In some embodiments, identifying spaces comprises identifying spaces based on a dataset name. In some embodiments, intercepting I/O requests comprises snooping communication between a database manager and a media manager. In some embodiments, allowing read and write operations comprises forwarding the I/O requests to a media manager and returning results to a database manager. In some embodiments, holding read requests comprises maintaining a list of read requests in a cache. Writing to a cache may comprise saving an image of the page. The method may include interrupting access to the database, receiving a communication from a recovery utility indicating a recovery process has been initiated, sending a communication to the recovery utility acknowledging the recovery process has been initiated, and starting the recovery process.

In another broad respect, embodiments disclosed herein may be directed to a computer-readable medium having a set of instructions stored thereon operable to identify a space in a database affected by a recovery process, intercept I/O requests intended for the space, allow read and write operations for a page in the space which is unaffected by the recovery process, hold read requests for a page in the space until the recovery process has recovered the page specified in the read request, write a page to a cache for spaces being recovered in the database, and write a page to the space once the page specified in the request has been recovered. The recovery process may be a forward recovery process or a backward recovery process. In some embodiments, identifying spaces comprises identifying pages based on a TORBA and a HIGHRBA. In some embodiments, intercepting I/O requests comprises snooping communication between a database manager and a media manager. In some embodiments, allowing read and write operations comprises forwarding the I/O requests to a media manager and returning results to a database manager. In some embodiments, holding read requests comprises maintaining a list of read requests in a cache. In some embodiments, writing to a cache comprises saving an image of the page. In some embodiments, the set of instructions may be executable to interrupt access to the database, receive a communication from a recovery utility indicating a recovery process has been initiated, send a communication to the recovery utility acknowledging the recovery process has been initiated, and start the recovery process.

In another broad respect, embodiments disclosed herein may be directed to a system for providing access to a database during recovery processes. In some embodiments, the system may include a database manager for receiving I/O requests for access to a space in a database, a media manager for performing read and write operations to the space, a recovery utility for recovering the space, and an Extended Buffer Manager (XBM) for intercepting I/O requests sent from the database manager and intended for the media manager, wherein I/O requests for data in a space that has been recovered are performed and I/O requests for data in a space being recovered are delayed until the page specified in the request has been recovered. In some embodiments, the system is operable to cache read requests for a space being recovered in a database manager held read list. In some embodiments, the system is operable to write a pre-image of a page to a cache for a page being recovered. In some embodiments, the system is operable to read a pre-image of a page in response to a request to read a page during a recovery process. In some embodiments, the system may further comprise a cache for storing pre-images. In some embodiments, the system may further comprise a database manager held read list for storing read requests for data affected by a recovery process and not recovered.

An advantage of embodiments disclosed herein is the ability to handle physical data recovery, which prior art approaches cannot address.

Another advantage of some embodiments relative to online rebuilding is the ability to apply to the index data as well as the tablespaces, which can greatly reduce outage.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of the disclosure, and the disclosure includes all such substitutions, modifications, additions or rearrangements

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION

Figure 1:
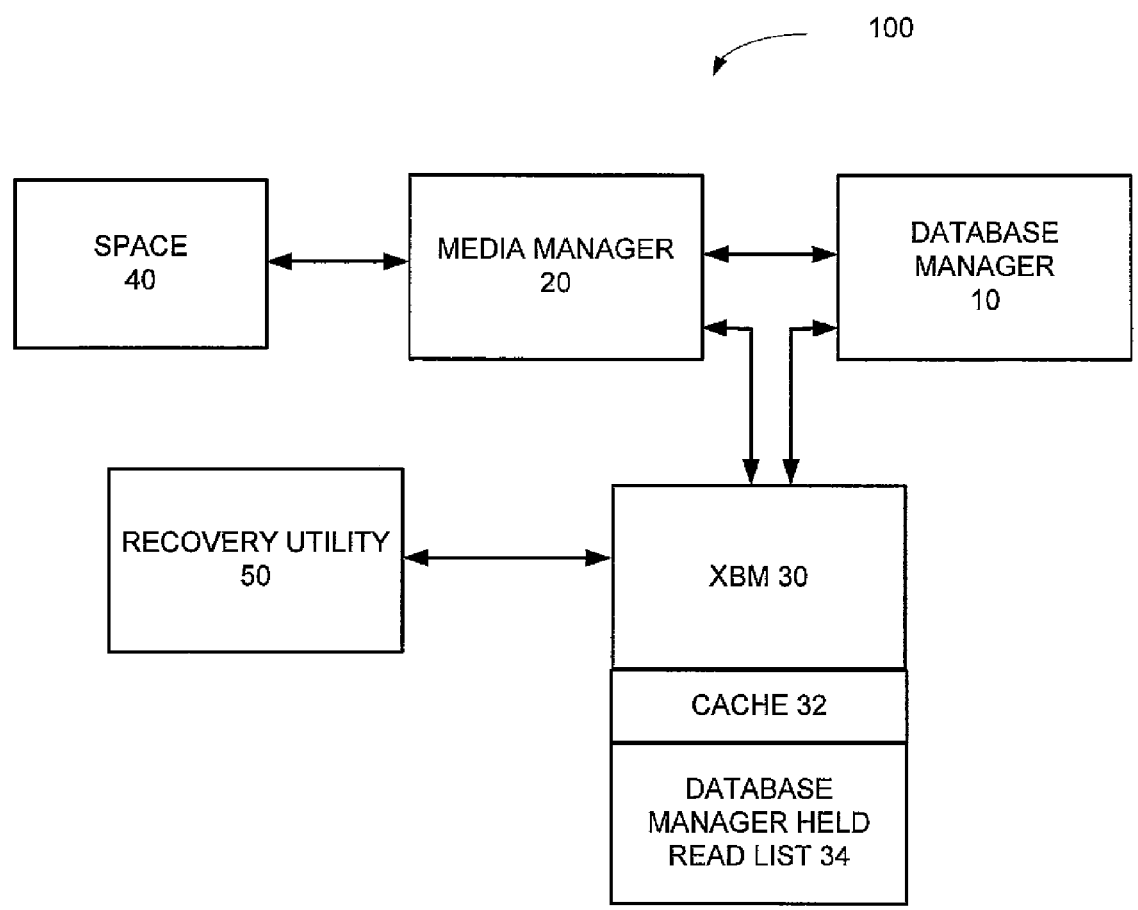
FIG. 1 depicts an architectural diagram of one embodiment of a system for providing access to data in spaces during a recovery process.

The disclosure and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments, examples of which are illustrated in the accompanying drawings. Wherever possible, the same reference numbers will be used throughout the drawings to refer to the same or like parts (elements). Before discussing specific embodiments, an exemplary hardware architecture for implementing certain embodiments is described. Specifically, one embodiment can include a computer communicatively coupled to a network (e.g., the Internet). As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (e.g., mouse, trackball, stylist, etc.), or the like. In some embodiments, the computer has access to at least one database.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like.

The functionalities and processes described herein can be implemented in suitable computer-executable instructions. The computer-executable instructions may be stored as software code components or modules on one or more computer readable media (e.g., non-volatile memories, volatile memories, DASD arrays, magnetic tapes, floppy diskettes, hard drives, optical storage devices, or any other appropriate computer-readable medium or storage device). In one exemplary embodiment, the computer-executable instructions may include lines of complied C++, Java, HTML, or any other programming or scripting code.

Additionally, the functions of the present disclosure may be implemented on one computer or shared/distributed among two or more computers in or across a network. Communications between computers implementing embodiments can be accomplished using any electronic, optical, radio frequency signals, or other suitable methods and tools of communication in compliance with known network protocols. While embodiments disclosed herein may be useful for providing access to a DB2 database during a recovery process and will be described as such, those skilled in the art will appreciate that other embodiments may be equally applicable for other databases during recovery processes and any such terminology used in conjunction with descriptions of such embodiments should not be construed in a limiting sense.

In some embodiments, a recovery process is initiated. In some embodiments, an administrator or other user may request a recovery be initiated. In some embodiments, one or more tablespaces, indexes, or both may be specified for recovery. In some embodiments, a target, such as a timestamp, may be specified. In some embodiments, a TORBA comprising a 48-bit hexadecimal number may identify a point in the Log to which the space needs to be recovered. A HIGHRBA value identifies the current point in the log after the recovery utility has initiated. Together, TORBA and HIGHRBA comprise the range of time in which pages affected by the recovery utility were updated.

FIG. 1 depicts an architectural diagram for an exemplary system 100 for providing access to data in spaces while the spaces are being recovered. FIG. 1 depicts database manager 10 in communication with media manager 20 and further in communication with Extended Buffer Manager for DB2® (XBM) 30. Database manager 10 (sometimes referred to as a database management system), is a program that lets one or more computer users create and access data in a database. Database manager 10 manages user requests (and requests from other programs) so that users and other programs are free from having to understand where the data is physically located on storage media and, in a multi-user system, who else may also be accessing the data. In handling user requests, database manager 10 ensures the integrity of the data (that is, making sure it continues to be accessible and is consistently organized as intended) and security (making sure only those with access privileges can access the data). DB2® from IBM® is one example of a relational database management system operable as database manager 10. In addition to communicating with database manager 10, media manager 20 may communicate with XBM 30 and read from and write to space 40. Database manager 10, media manager 20, XBM 30, space 40, and recovery utility 50 may be distributed and communicate over an Intranet or Internet, LAN, WAN, or may be located in a single computer or IBM sysplex.

Media manager 20 accesses space 40 to process and perform read and write requests. XBM 30 may monitor communication between database manager 10, media manager 20, space 40, and recovery utility 50 to preserve the integrity of space 40 during recovery processes. In some embodiments, XBM 30 may include database manager held read list 34, which may contain a list of read requests from database manager 10 which have been held up until recovery utility 50 has finished with them, a cache 32 of pre-images of pages to pass to recovery utility 50, the number of the last page written by recovery utility 50, the TORBA and HIGHRBA of the recovery process, and the dataset name model of each space 40 being recovered, XBM 30 may snoop (intercept) I/O requests and examine page images to prevent database manager 10 from reading from or writing to a page while recovery utility 50 is recovering the page to a previous state.

Recovery utility 50 maintains awareness of the current state of space 40 during recovery. Recovery utility 50 writes the pages of space 40 in ascending sequence, such that each page is written only once. Recovery utility 50 may track the last page number it has written to space 40. Recovery utility 50 may disable or enable access to space 40. RECOVER PLUS by BMC Software, Inc. of Houston Tex. is one example of recovery utility 50 useful for performing a PIT recovery.

In some embodiments, a recovery process may be a backward recovery process (also referred to as a backout process), in which the recovery process begins at the HIGHRBA and proceeds to the TORBA. In some embodiments, a backward recovery process may involve recovery utility 50 writing only selected pages to space 40. A recovery process may be a forward recovery process, in which the process begins at the TORBA and proceeds to the HIGHRBA. A forward recovery process may involve recovery utility 50 writing each page to space 40.

Figure 2:
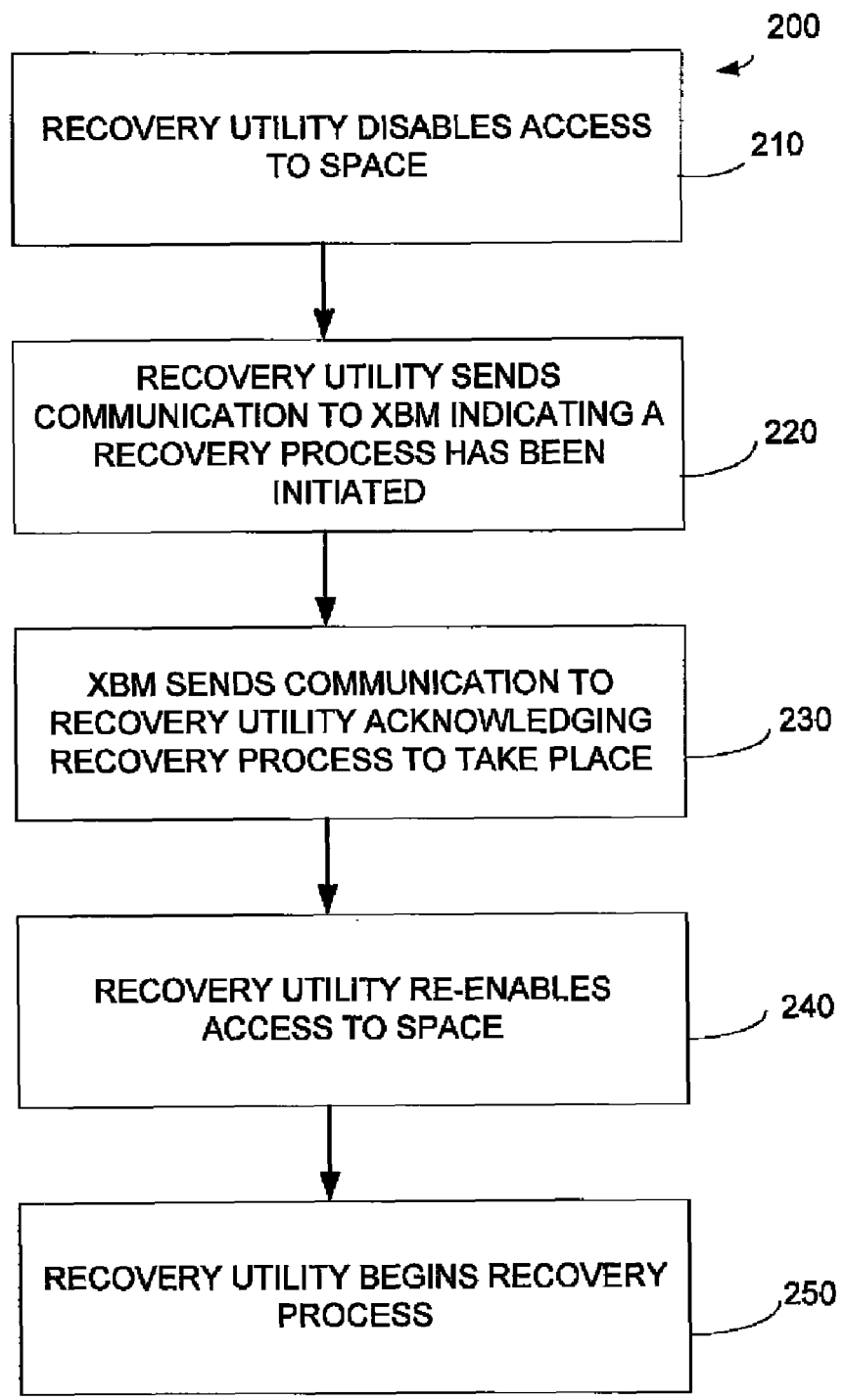
FIG. 2 depicts a flow diagram for one embodiment of how a recovery process may be initiate to provide access to a space during the recovery process.

FIG. 2 depicts a flow diagram for one embodiment of how a recovery process may initiate communication with XBM 30.

In step 210 of one embodiment of recovery process 200, once a recovery operation has been initiated, recovery utility 50 may disable access to space 40 for programs accessing the data through database manager 10.

In step 220, recovery utility 50 may send a communication to XBM 30 indicating that a recovery process has been initiated. The communication may include a TORBA and HIGHRBA, and a dataset name model for each space 40 to be recovered, such that space 40 can be identified using a dataset name. In some embodiments, a PIT recovery has a beginning and an ending Relative Byte Address (RBA) or Log Record Sequence Number (LRSN). All reads and writes for pages last updated outside this range may be processed by media manager 20 without delay.

In step 230, upon receiving the communication from recovery utility 50, XBM 30 may send a communication to recovery utility 50 acknowledging that the recovery process is taking place.

In step 240, after receiving the acknowledgement, recovery utility 50 may re-enable I/O access to the affected space or spaces (e.g., allow read/write access to space 40).

In step 250, recovery utility 50 may begin the recovery process to the pages in space 40. The recovery process may entail copying one or more database objects to provide point-in-time consistent copies without impacting the databases. The Extended Buffer Manager for DB2® (XBM) or SNAP-SHOT UPGRADE FEATURE for DB2® by BMC Software, Inc. of Houston Tex. are examples of a system useful for generating PIT copies of a database. U.S. Pat. No. 7,133,884, issued Nov. 7, 2006 to Murley et al, discloses a method for unobtrusive point-in-time consistent copies, and is hereby incorporated by reference.

Figure 3:
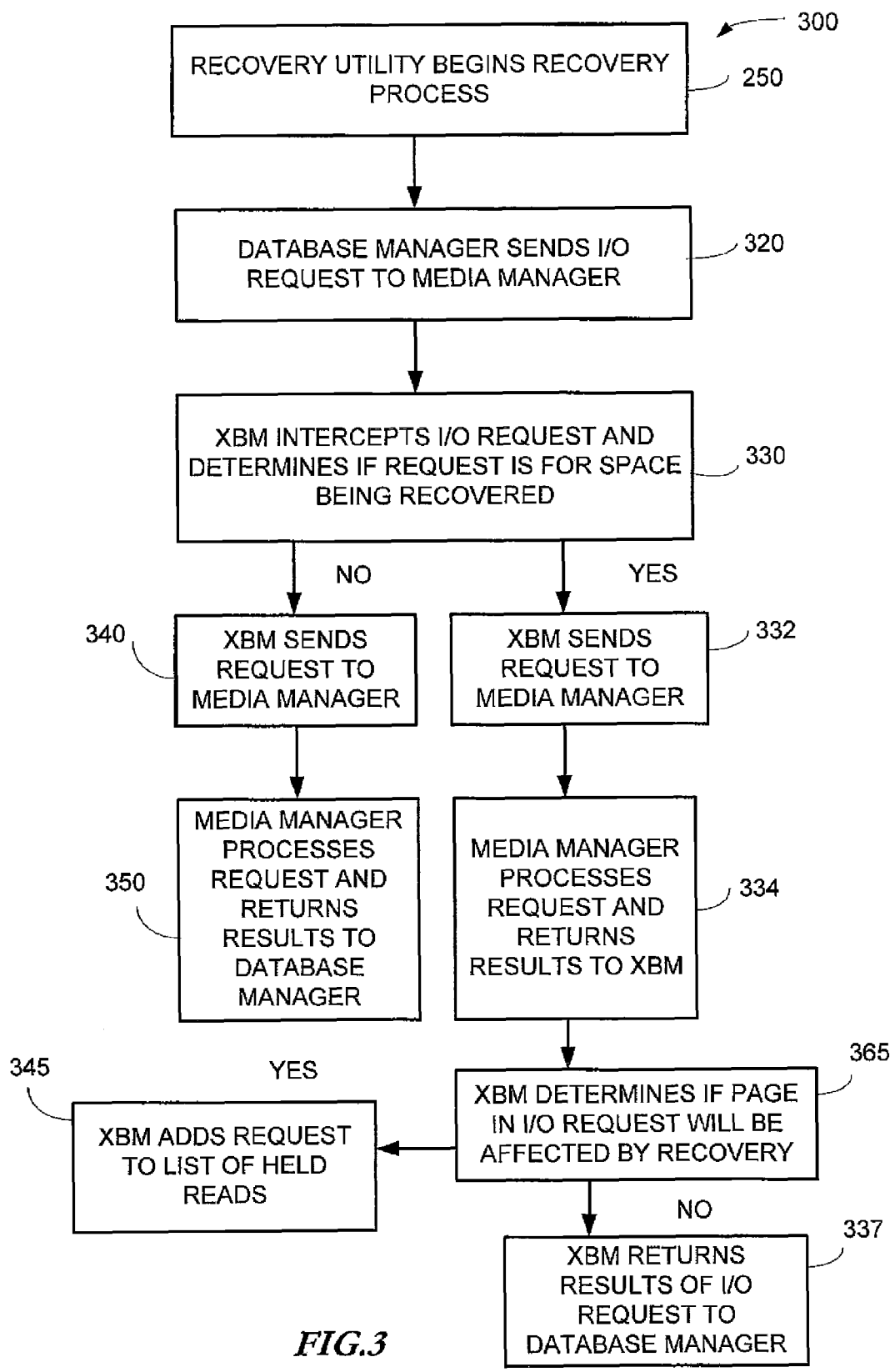
FIG. 3 depicts a flow diagram for one embodiment of a method for intercepting I/O requests during a recovery process to determine which pages are affected by the recovery process.

FIG. 3 depicts a flow diagram for one embodiment of a method for intercepting I/O requests to a space during a recovery process. In particular, FIG. 3 depicts a flow diagram for one embodiment of a method for allowing database manager 10 to read a page from space 40.

In step 250, recovery utility 50 begins a recovery process to the pages in space 40.

In step 320 database manager 10 may send an I/O request to media manager 20.

In step 330, XBM 30 may intercept the I/O request because recovery utility 50 notified XBM 30 that a recovery process is taking place. In some embodiments, recovery utility 50 may identify space 40 that will be recovered (e.g., using the dataset name in the request). In some embodiments, XBM 30 may determine if space 40 is in the process of being recovered by recovery utility 50. XBM 30 may analyze the request and generate a new request before sending the new request to media manager 20 with instructions to return the result to XBM 30 instead of database manager 10. In some embodiments, when a request is received from database manager 10 into XBM 30, XBM 30 may analyze the request to determine if data requested by database manager 10 has been cached by XBM 30. XBM 30 may return the cached information to database manager 10. Database manager 10 may not know that the data has been returned by XBM 30, because XBM 30 may appear to database manager 10 as if XBM 30 were media manager 20.

In step 330, XBM 30 determines if space 40 is in the process of being recovered by comparing the dataset of the requested page with the dataset communicated by recovery utility 50.

In some embodiments, if XBM 30 determines in step 330 that requested space 40 is not affected by the recovery process (e.g., the requested page does not match the space being recovered), then in step 340 XBM 30 forwards the request to media manager 20. In step 350, media manager 20 processes the request, performs any read/write functions, and returns the results to database manager 10. In some embodiments, media manager 20 may return the results to XBM 30 and XBM 30 forwards the results to database manager 10.

In some embodiments, if in step 330 XBM 30 determines that space 40 is being recovered, then in step 332 XBM 30 may pass the I/O request to media manager 20. In step 334, media manager 20 may process the request, perform any read/write functions, and return the results to XBM 30. In step 336, if XBM 30 determines that the page requested is not affected by the recovery (e.g., the PGLOGRBA of the page is not between the TORBA and HIGHRBA values, and the page is not a header page), XBM 30 may return the results of the I/O request to database manager 10.

In some embodiments, if in step 336 XBM 30 determines that the requested page is being recovered (e.g., the PGLOGRBA is greater than the TORBA and less than HIGHRBA, or the requested page is a header page), then in step 345 XBM 30 may add the request to database manager held read list 34 such that the results of a read request in database manager held read list 34 may not be returned to database manager 10 until recovery utility 50 has recovered the page specified in the request.

Figure 4:
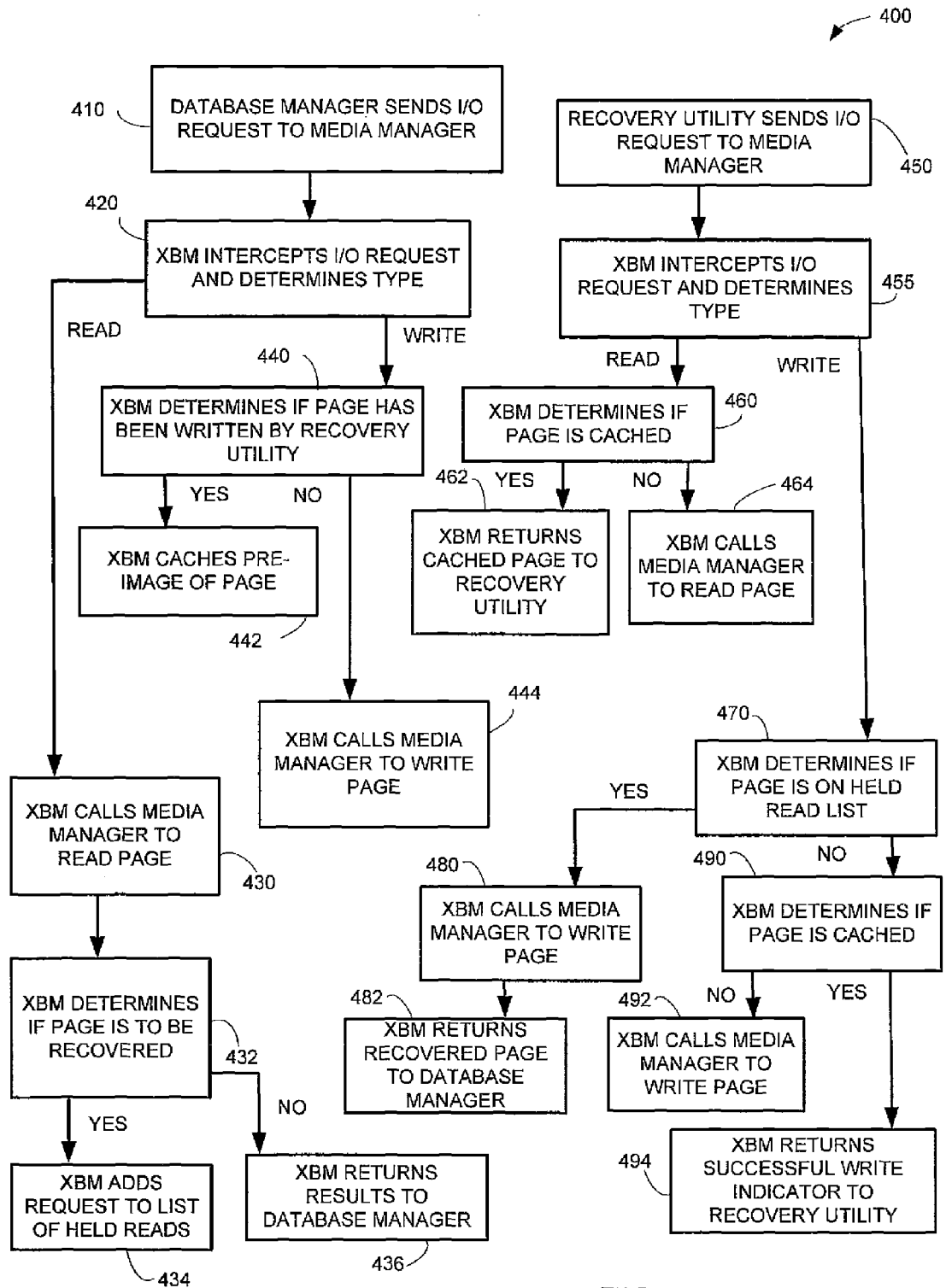
FIG. 4 depicts a flow diagram of an exemplary method for providing read and write access to pages in a space during recovery of the space.

FIG. 4 depicts an exemplary flow diagram of one embodiment for allowing database manager 10 to read from or write to space 40 during a recovery process.

Recovery utility 50 may begin a recovery process. In some embodiments, when a PIT recovery begins a recovery process, access to space 40 is temporarily disabled and the database buffers are flushed (e.g., a DRAIN is issued). In some embodiments, a current RBA is established as the end of a PIT range. In some embodiments, each PIT space in a recovery process may be allocated with the Integrity Bit OFF to allow writing to space 40 managed by database manager 10. In some embodiments, recovery utility 50 establishes itself as a privileged user while initializing PIT recovery with XBM 30. In some embodiments, low and high RBA values may be used to mark the boundaries of a PIT recovery.

Once recovery utility 50 has sent the INIT PIT call to XBM 30, the DRAIN can be released and access to space 40 may be resumed. In doing so, embodiments of the present disclosure are able to allow processing to continue during the recovery process, whereas during prior art PIT recovery, access to space 40 would have been disabled for the duration of the recovery process. In some embodiments, the command sequence for initializing a recovery process may include causing database manager 10 to disallow read and write requests to space 40 and to wait until outstanding requests have completed (e.g., acquire a DRAIN), flushing database buffers for space, getting a current point in time for end-of-PIT range (e.g., a TORBA), calling XBM 30 to initiate a recovery process (e.g., call INIT PIT) recovery for space 40, and causing database manager 10 to allow reads and writes (e.g., release the DRAIN).

In some embodiments, in step 410, database manager 10 may send an I/O request to media manager 20. In step 420, XBM 30 may intercept the I/O request and determine if it is for a space being recovered, and may further determine whether the I/O request is for a read operation or a write operation.

If the I/O request is for a read operation, in step 430, XBM 30 may call media manager 20 to perform the read operation. In step 432, XBM may examine the page image returned to determine if the page is to be recovered. In some embodiments, XBM 30 may determine if the page returned is to be recovered based on whether the recovery process is a forward or backward recovery. If the recovery process is a forward recovery, the page is to be recovered if the page number is less than the recorded number of the page last written by recovery utility 50. In some embodiments employing a backward recovery process, the page may be identified for recovery if the PGLOGRBA value from the page is greater than TORBA and less than HIGHRBA or if the page is a header page. If the page is identified as a page to be recovered, in step 434, XBM 30 may add the I/O request to a list of held database manager reads. Alternatively, if the page is not to be recovered or has already been recovered, in step 436 XBM 30 may return the results of the I/O request to database manager 10.

If the I/O request from database manager 10 is for a write operation, in step 440, XBM 30 may determine if the page has been written by recovery utility 50 (e.g., the page number is lower than the recorded number of the page last written by recovery utility 50). If the page has been written, in step 444 XBM 30 may call media manager 20 to write the page and media manager 20 may return the results of the I/O operation to database manager 10. Alternatively, if the page has not been written by recovery utility 50, in step 442 XBM 30 may read the page from disk and may cache the pre-image of the page before passing the write request to media manager 20 in step 444. One example of how a pre-image of a page may be cached is a "software snapshot" such as described in U.S. Pat. No. 6,202,136, "Method of Creating an Internally Consistent Copy of an Actively Updated Dataset without Specialized Caching Hardware", which is hereby incorporated by reference.

In some embodiments, in step 450, recovery utility 50 may send an I/O request to media manager 20. In step 455, XBM 30 may intercept the I/O request and determine the type. In some embodiments, if the I/O request is for a read (e.g., a request to read data from space 40 in the database), in step 460 XBM 30 may determine if the page is in cache 32. If the page is in cache 32, in step 462 XBM 30 may return the cached pre-image of the page to recovery utility 50. Alternatively, if the page is not in cache 32, in step 464 XBM 30 may call media manager 20 to perform the read and media manager 20 may return the results of the I/O request to recovery utility 50. If the I/O request is for a write (e.g., a request to write data to space 40 in the database), in step 470 XBM determines if the page is on database manager held read list 34. If it is, in step 480 XBM 30 may call media manager 20 to write the page image from recovery utility 50 to the page in database manager held read list 34 and wait for media manager 20 to complete the write operation. Then in step 482 XBM may return the page image from recovery utility 50 to database manager 10 to respond to the read request from database manager 10 which has been held.

In some embodiments, if the page is not on database manager held read list 34, in step 490 XBM 30 may determine if the page has been written to cache 32. If it is, in step 494 XBM 30 may not write the page but may return a success indicator to the recovery process. If the page is not cached, XBM 30 may call media manager 20 to perform the write operation. Media manager 20 may perform any write operations and may return the results of the I/O request to recovery utility 50.

In the foregoing specification, the invention has been described with reference to specific embodiments. However, one of ordinary skill in the art will appreciate that various modifications and changes can be made without departing from the spirit and scope of the invention disclosed herein. Accordingly, the specification and figures disclosed herein are to be regarded in an illustrative rather than a restrictive sense, and all such modifications are intended to be included within the scope of the disclosure.

What is claimed is:

1. A method for providing access to a space in a database during a recovery process, comprising:
    identifying a space in a database being recovered by a recovery utility, wherein the space is identified by a first address specifying a first point to which the space is to be recovered and a second address identifying a current point in the recovery process;
    intercepting I/O requests intended for the database;
    allowing the I/O requests which are read or write operations for a first page in the space which is unaffected by the recovery process;
    holding read requests for a specified second page in the space until the recovery process has recovered the second page specified in the read request;
    writing the second page to a cache for the space being recovered in the database; and
    writing the second page to the space once the space has been recovered.

2. The method of claim 1, wherein the recovery process is a forward recovery process.

3. The method of claim 1, wherein the recovery process is a backward recovery process.

4. The method of claim 1, wherein identifying spaces comprises identifying the space based on a TORBA and a HIGHRBA.

5. The method of claim 1, wherein intercepting I/O requests comprises snooping communication between a database manager and a media manager.

6. The method of claim 1, wherein allowing the I/O requests which are read and write operations comprises forwarding the I/O requests to a media manager and returning results to a database manager.

7. The method of claim 1, wherein holding read requests comprises maintaining a list of read requests in the cache.

8. The method of claim 1, wherein writing to the cache comprises saving an image of the page.

9. The method of claim 1, further comprising:
    interrupting access to the database;
    sending a first communication from a recovery utility to an Extended Buffer Manager (XBM) indicating a recovery process has been initiated;
    sending a second communication from the XBM to the recovery utility acknowledging the recovery process has been initiated; and
    starting the recovery process.

10. A computer-readable medium having a set of instructions stored thereon operable to execute the following:
    identifying a space in a database being recovered by a recovery utility, wherein the space is identified by a first address specifying a first point to which the space is to be recovered and a second address identifying a current point in the recovery process;
    intercepting I/O requests intended for the database;
    allowing the I/O requests which are read and or write operations for a first page in the space which is unaffected by the recovery process;
    holding read requests for a specified second page in the space until the recovery process has recovered the second page specified in the read request;
    writing the second page to a cache for the space being recovered in the database; and
    writing the second page to the space once the space has been recovered.

11. The set of instructions of claim 10, wherein the recovery process is a forward recovery process.

12. The set of instructions of claim 10, wherein the recovery process is a backward recovery process.

13. The set of instructions of claim 10, wherein identifying the space comprises identifying spaces based on a TORBA and a HIGHRBA.

14. The set of instructions of claim 10, wherein intercepting I/O requests comprises snooping communication between a database manager and a media manager.

15. The set of instructions of claim 10, wherein allowing the I/O requests which are read and write operations comprises forwarding the I/O requests to a media manager and returning results to a database manager.

16. The set of instructions of claim 10, wherein holding read requests comprises maintaining a list of read requests in the cache.

17. The set of instructions of claim 10, wherein writing to the cache comprises saving an image of the page.

18. The set of instructions of claim 10, further executable to:
    interrupt access to the database;
    send a first communication from a recovery utility to a database manager indicating a recovery process has been initiated;
    send a second communication from the database manager to the recovery utility acknowledging the recovery process has been initiated; and
    start the recovery process.

19. A system for providing access to a database during recovery processes, comprising:
    a database manager for receiving I/O requests for access to a space in a database;
    a media manager for performing read and write operations to the space;
    a recovery utility for recovering the space; and
    an Extended Buffer Manager (XBM) for intercepting I/O requests sent from the database manager and intended for the media manager, configured for:
        associating an I/O request with a first page based on a first address specifying a first point to which the space is to be recovered and a second address identifying a current point in the recovery process, wherein if the I/O request is for data in a first page that has been recovered or will not be recovered the I/O request is performed and if the I/O request is for data in a second page being recovered the I/O request is delayed until a second page in the space specified by the I/O request has been recovered;
        writing the second page to a cache for the space being recovered in the database; and
        writing the second pace to the space once the space has been recovered.

20. The system of claim 19, wherein the system is operable to cache read requests for a space being recovered in a database manager held read list.

21. The system of claim 19, wherein the system is operable to write a pre-image of a page to a cache for a page being recovered.

22. The system of claim 21, wherein the system is operable to read a pre-image of a page in response to a request to read a page during a recovery process.

23. The system of claim 19, wherein the cache is configured for storing pre-images.

24. The system of claim 19, further comprising read list held by the database manager for storing read requests for data affected by a recovery process and not recovered.

* * * * *